(12) United States Patent
Schwenk et al.

(10) Patent No.: US 6,760,445 B1
(45) Date of Patent: Jul. 6, 2004

(54) METHOD FOR IDENTIFYING BETRAYERS OF PROPRIETARY DATA

(75) Inventors: Joerg Schwenk, Dieburg (DE); Johannes Ueberberg, St. Augustin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/554,177

(22) PCT Filed: Nov. 4, 1998

(86) PCT No.: PCT/EP98/07045

§ 371 (c)(1),
(2), (4) Date: May 10, 2000

(87) PCT Pub. No.: WO99/25090

PCT Pub. Date: May 20, 1999

(30) Foreign Application Priority Data

Nov. 10, 1997 (DE) ......................... 197 50 779

(51) Int. Cl.$^7$ .............................................. G06F 17/00
(52) U.S. Cl. ....................... 380/278; 713/171; 380/277
(58) Field of Search ................................ 713/168–181, 713/182–202; 380/277–286

(56) References Cited

U.S. PATENT DOCUMENTS 6,549,638 B2 * 4/2003 Davis et al. ................ 713/189
6,557,103 B1 * 4/2003 Boncelet et al. ........... 713/201
6,640,305 B2 * 10/2003 Kocher et al. .............. 713/194

OTHER PUBLICATIONS

Dittman, Combining digital watermarks and collusion secure fingerprints for customer copy monitoring, Secure Images and Image Authentication (Ref. No. 2000/239), IEE Seminar on, Apr. 10, 2000, pp. 6/1–6/6.*

Kou et al., Low density parity check codes: construction based on finite geometries, Global Telecommunications Conference, 2000, GLOBECOM '00. IEEE, vol. 2, 27, Nov.–Dec. 2000, pp. 825–829, vol. 2.*

Kou et al., Low–density parity check codes based on finite geometries: a rediscovery and new results, Information Theory, IEEE Transactions on, vol. 47, Issue 7, Nov. 2001, pp. 2711–2736.*

Chor B. et al., "Tracing Traitors", Aug. 1994, pp. 257–270, Advances in Cryptology.

* cited by examiner

Primary Examiner—David Jung
(74) Attorney, Agent, or Firm—Kenyon & Kenyon

(57) ABSTRACT

A method for identifying betrayers of proprietary data which enables a betrayer, i.e., an authorized subscriber who has disclosed one of his partial keys to a third person without authorization, to be unequivocally identified. A respective subset of encryption keys is assigned to each authorized subscriber according to finite geometric structures and methods such that the necessary characteristic of the k-resilience used for identifying a betrayer is guaranteed. A betrayer search algorithm is used for the unequivocal identification of a betrayer. Coalitions of betrayers may also be unequivocally identified.

10 Claims, 3 Drawing Sheets

METHOD FOR IDENTIFYING BETRAYERS OF PROPRIETARY DATA

FIELD OF THE INVENTION

The present invention relates to a method for identifying betrayers of proprietary data, i.e., authorized users who without authorization pass on proprietary data, the proprietary data being encrypted.

RELATED TECHNOLOGY

In modern information technology, it is becoming increasingly important to be able to distribute proprietary data as secure data to an authorized group of customers. Examples of this are digital pay-TV, data broadcasting, data distribution using CD-ROM, and fee-based online databases.

In all the aforementioned media, the information is distributed in encrypted form. It is customary that several authorized persons are able to decrypt this information. In practice, it is frequently the case that such proprietary data is passed on, or retransmitted without authorization to third parties. In the systems used today, it is not possible to detect the source of this type of unauthorized passing-on, or redistribution.

A first approach to solving this problem is discussed in the article "Tracing Traitors" by Chor, Fiat and Naor, published in the Proceedings on CRYPTO 194 (Springer Heidelberg, Lecture Notes in Computer Science 839). This article is hereby incorporated by reference herein. The article presents a probabilistic method for developing a so-called "traitor tracing" strategy, which can be used to find "traitor", even if he is in collusion with up to k–1 other traitors (the article refers to this property as k-resilient).

Here, "probabilistic" means that virtually all the values in such a strategy are randomly selected. This is a disadvantage when the results of such a strategy are used in court proceedings against a person who has passed on proprietary information, without authorization. A technical report prepared by an expert that is based on probabilities has little prospect of being accepted as evidence.

One of the core aspects of the strategy described in the aforementioned article is the fact that communication session key S, which is used to encrypt the data, is divided into t subkeys $s_1, \ldots, s_t$. The session key S can only be reconstructed with knowledge of all t parts. Each of these subkeys $s_1, \ldots, s_t$ is then encrypted using each encryption key from a set of encryption keys PK, and the entirety of these cryptograms is placed in front of, or upstream of the data as a so-called "access block". Each authorized user, or subscriber U receives a subset of encryption keys PK(U) $\subseteq$ PK, which enables him to calculate all the subkeys $s_1, \ldots, s_t$.

A property of these subsets PK(U) of encryption keys is that no combination of up to k of these subsets contains another subset in its entirety. This is a necessary precondition of the property of k-resilience.

SUMMARY OF THE INVENTION

An object of the present invention is to provide a method for identifying betrayers, or traitors of proprietary data, making it possible to identify unequivocally at least one betrayer $\overline{U}$ (i.e., an authorized user U who has, without authorization, passed on one of his subkeys to a third person), the identification method thus being acceptable as unequivocal evidence in court proceedings.

The present invention provides a method for identifying at least one betrayer of proprietary data, the method including encrypting the proprietary data using a session key; dividing the session key into a plurality of subkeys, all of the plurality of subkeys being required to reconstruct the session key; encrypting each of the plurality of subkeys using each encryption key of a plurality of encryption keys so as to form a plurality of cryptograms; placing the plurality of cryptograms in front of the proprietary data as an access block; and assigning a respective subset of the plurality of encryption keys to each of a plurality of authorized users in accordance with at least one finite geometry structure and at least one finite geometry method so as to enable each user to reconstruct the plurality of subkeys and so as to ensure a k-resilience property for unequivocally identifying the at least one betrayer using a betrayer-search algorithm, k being a maximum number of betrayers in the at least one betrayer. As in the known method described above in a method according to the present invention, data to be encrypted are encrypted using a session key S. The session key S is subdivided into t subkeys $s_1, \ldots, s_t$, all of which are required to reconstruct the session key S. Each subkey $s_1, \ldots, s_t$ is encrypted using each encryption key PK from the set of encryption keys PK. The entirety of such cryptograms is placed as an access block in front of the data to be encrypted.

A method according to the present invention includes a search strategy which differs in its deterministic construction from the search strategy of the previously described method.

According to the present invention, encryption keys PK are assigned to authorized users U in accordance with geometrical structures and methods of finite geometry. Each authorized user U is allocated a subset of encryption keys PK(U) which enables him to reconstruct in each case one of subkeys $s_i$ for $i=1, \ldots t$ and, thus, also the session key S. Assigning the encryption keys according to geometrical structures and finite geometry methods ensures that every k authorized users have a total of no more than $$\frac{|PK(U)|}{k} - 1$$

encryption keys in common with each other authorized user.

Consequently, the k-resilience property, required for identifying a betrayer $\overline{U}$, is ensured. At least one betrayer $\overline{U}$ can then be identified with certainty using a betrayer-search algorithm.

According to an embodiment of the present invention, the session key may be divided into t subkeys $s_1, \ldots, s_t$ using a threshold method so that the session key is reconstructable using one of the subkeys. The threshold method may be, for example, an r, t threshold method. The method according to the present invention is described in greater detail in the following on the basis of an exemplary embodiment, the finite geometry structure used being conceived as a finite affine space AG. Such geometrical concepts are described in A. Beutelspacher, U. Rosenbaum, Projektive Geometrie [Projective Geometry], Vieweg Publishers, Wiesbaden 1992, which is hereby incorporated by reference herein.

DETAILED DESCRIPTION

According to an embodiment of the present invention, each of authorized users U is represented as a point in a finite affine plane. One can imagine a finite affine plane to be a Euclidean (i.e., "normal") plane, containing only a finite number of points, however.

Such a finite affine plane is also referred to as AG(2,q), where number 2 is the plane's dimensions, and parameter q indicates the number of points which lie on a straight line in the plane. The plane contains a total of $q^2$ points. Such planes may be constructed as two-dimensional vector spaces above the finite body GF(q), i.e., they exist for all prime powers q.

As does the normal Euclidean plane, the finite affine plane AG(2,q) has parallel straight lines. The set of all straight lines, which are parallel to a given straight line, is referred to as a family of parallel lines. Each family of parallel lines of the finite affine plane AG(2,q) contains q straight lines. To obtain a k-resilient method, the session key (S) is subdivided into $t=k^2+1$ subkeys $s_1, \ldots s_t$. Next, $k^2+1$ families of parallel lines are selected. Each of the $q(k^2+1)$ straight lines in these families of parallel lines has an encryption key from PK assigned to it, and subkey $s_1$ is encrypted using all the encryption keys belonging to the i-th family of parallel lines. Each authorized user U is given precisely those encryption keys belonging to the straight lines which pass through his point.

Figure 1:
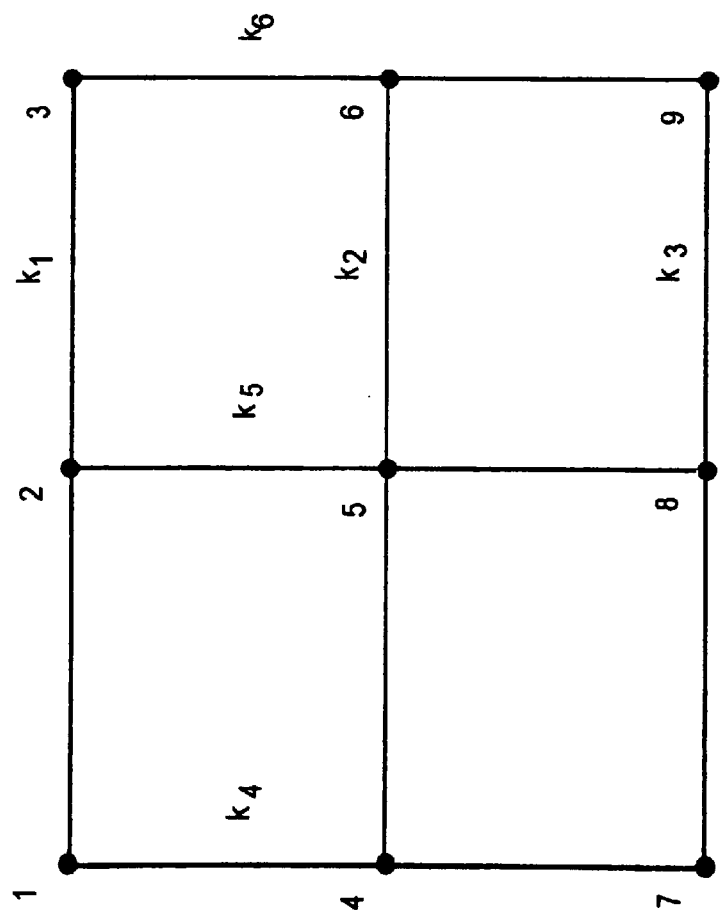
FIG. 1 shows a schematic diagram depicting a search strategy in the finite affine space AG (2,3), where s=1.

FIG. 1 illustrates the situation for k=1 and q=3. Here, authorized user I is given encryption keys $k_1$ and $k_4$, since the two straight lines associated with these encryption keys pass through his point. Here, it can also be seen that the strategy according to FIG. 1 is resilient, since authorized user U has no more than one encryption key $k_i$ in common with each other authorized user U, i.e., his set of encryption keys does not cover any other set of encryption keys. If authorized user U were a betrayer, he would have to introduce his two encryption keys $k_1$ and $k_4$ into a pirate decoder to allow unauthorized persons to decrypt. From encryption keys $k_1$ and $k_4$ in the pirate decoder, the system operator is able to clearly prove that authorized user U has made his encryption keys $k_1$ and $k_4$ available to an unauthorized person for purposes of manipulation and has thereby become a betrayer $\overline{U}$.

The method according to the present invention is also suited, given an appropriate choice of parameters k and q, for detecting the unauthorized passing-on of encryption keys by a maximum of k authorized users, i.e., for detecting a betrayer in a coalition of, at the most, k betrayers.

At least one of the betrayers $\overline{U}$ must divulge at least k+1 encryption keys, so that a complete set of $k^2+1$ encryption keys comes together for the pirate decoder. (Pigeon-loft principle: If $k^2+1$ pigeons are distributed among only k lofts, then there must be at least k+1 pigeons in at least one loft.)

Figure 2:
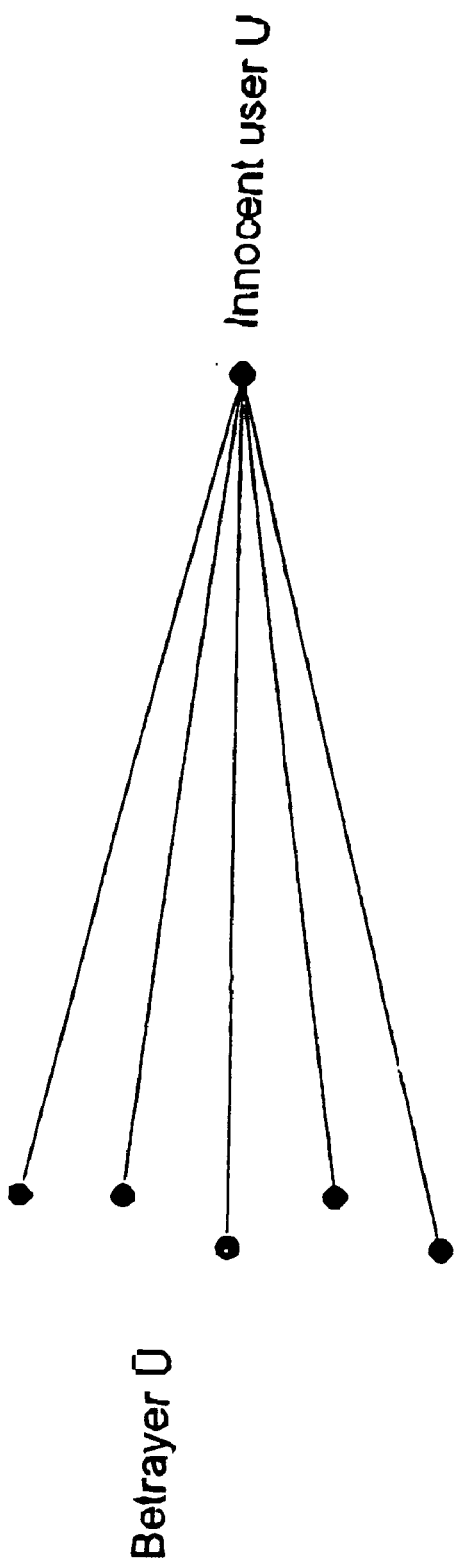
FIG. 2 shows a schematic diagram depicting straight connecting lines between a betrayer $\overline{U}$ and an innocent authorized user U.

Each betrayer $\overline{U}$ knows not more than one encryption key of each innocent, authorized user U, since, at the most, he can know that encryption key which lies on the straight connecting line between the point of the innocent, authorized user U and the point of betrayer $\overline{U}$. In affine planes, there are precisely k such straight connecting lines, and not all need belong to one of the selected families of parallel lines (see FIG. 2).

The parameters (number of encryption keys, length of the access block) may be improved according to the present invention by applying the construction to finite affine spaces AG (d,q) of greater dimensions d (finite projective space PG). The construction is begun in the finite projective space PG (d,q) with the same parameters. A hyperplane H, i.e., a subspace of dimensions d-1, is drawn in this space. This special hyperplane is later removed, the consequence being that finite affine space AG(d,q) results from finite projective space PG(d,q).

A set of (d-1) $k^2+1$ subspaces of dimensions d-2 is selected in hyperplane H, the subspaces having the property that no more than d-1 of these subspaces intersect at a common point of hyperplane H. The set of these subspaces is identified by E.

E can be constructed by observing a rational normal curve in the dual hyperplane $\overline{H}$ of hyperplane H. One obtains $\overline{H}$ from H (and vice versa) if one thinks of the points of H as hyperplanes (dimensions d-2) of $\overline{H}$, the straight lines of H as subspaces of dimensions d-3, etc. A rational normal curve $\overline{R}$ of $\overline{H}$ can be given in homogeneous coordinates as $$R=\{(1,t,t^2,\ldots,t^{d-1})|t \in GF(q)\} \cup \{0,0,0,\ldots,0,1\}.$$

The points of $\overline{R}$ have in $\overline{H}$ the property that no more than d-1 of them lie in a common hyperplane (of $\overline{H}$). At the transition to the hyperplane H, i.e., to the dual space, the points of $\overline{R}$ become hyperplanes of a set R which have the property that no more than d-1 of these hyperplanes intersect at a common point. Set E is obtained by selecting (d-1) $k^2+1$ elements from R.

Figure 3:
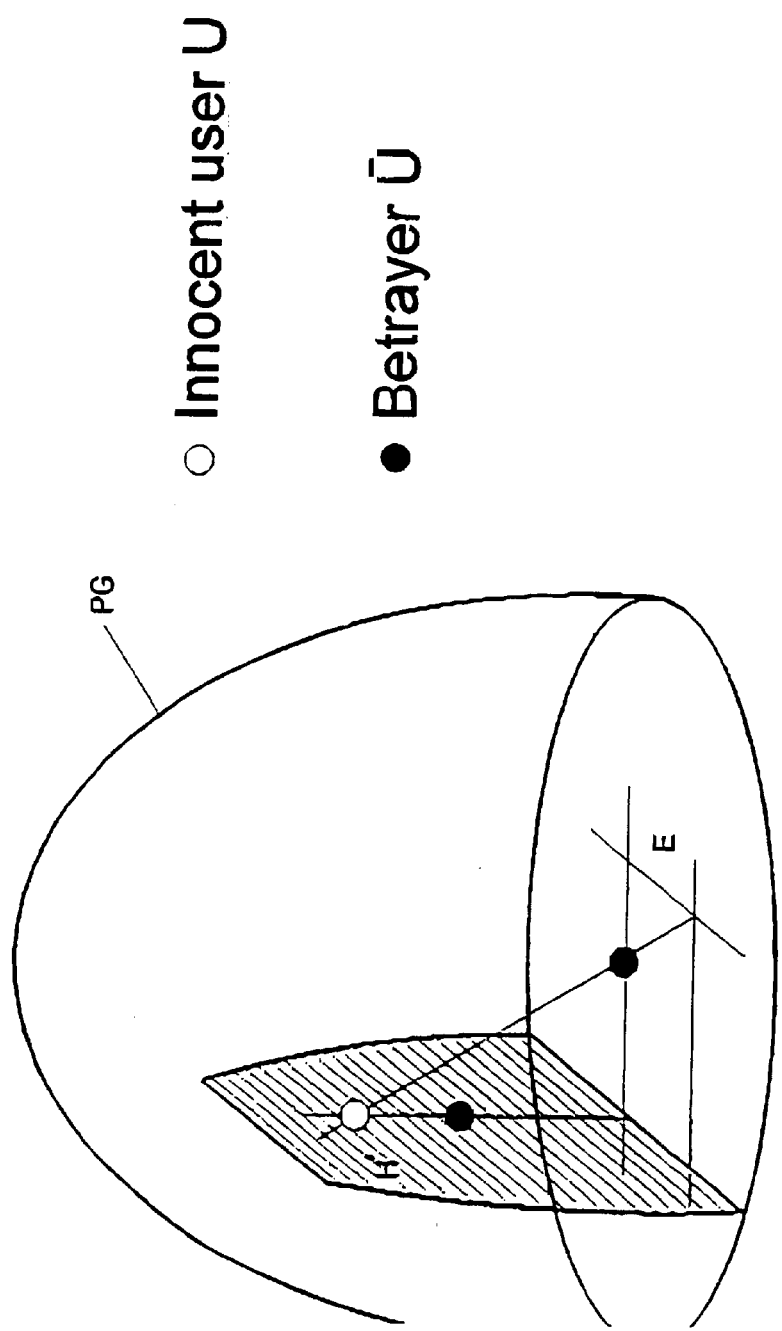
FIG. 3 shows a schematic diagram depicting the structure of a betrayer-search strategy in the finite projective space PG (3,q).

Each authorized user U is now allocated a point in the finite projective space PG(d,q) which does not lie in hyperplane H (after removal of hyperplane H, all these points lie in the finite affine space AG(d,q)). An encryption key is assigned to each hyperplane H' in finite projective space PG (d,q) which intersects hyperplane H in an element of set E. Each authorized user U is then given an encryption key when corresponding hyperplane H' passes through his point. FIG. 3 shows this construction for dimension 3.

A betrayer $\overline{U}$ knows at least one encryption key of an innocent, authorized user U when the straight connecting line through the two points intersects set E. How many encryption keys the betrayer $\overline{U}$ knows is determined by how many elements of set E the straight connecting line hits. This can be no more than d-1, because no more than d-1 elements of E can intersect at the point where the straight connecting line intersects with H.

In the case of k betrayers $\overline{U}$, this means that all of them together can know no more than k (d-1) encryption keys of an innocent authorized user U. According to the pigeon-loft principle, however, at least one of betrayers $\overline{U}$ must introduce k (d-1)+1 encryption keys. This ensures that one betrayer $\overline{U}$ can always be identified with certainty when the pirate decoder is read out.

What is claimed is:

1. A method for identifying at least one betrayer of proprietary data, the method comprising:

encrypting the proprietary data using a session key;

dividing the session key into a plurality of subkeys, all of the plurality of subkeys being required to reconstruct the session key;

encrypting each of the plurality of subkeys using each encryption key of a plurality of encryption keys so as to form a plurality of cryptograms;

placing the plurality of cryptograms in front of the proprietary data as an access block; and assigning a respective subset of the plurality of encryption keys to each of a plurality of authorized users in accordance with at least one finite geometry structure and at least one finite geometry method so as to enable each user to reconstruct the plurality of subkeys and so as to ensure a k-resilience property for unequivocally identifying the at least one betrayer using a betrayer-search algorithm, k being a maximum number of betrayers in the at least one betrayer.

2. The method as recited in claim 1 wherein the finite geometry structure includes at least one of a finite affine space and a finite projective space.

3. The method as recited in claim 1 wherein the finite geometry structure is a finite projective space and wherein the assigning includes:

identifying a hyperplane in the finite projective space;

assigning to each of the plurality of authorized users a respective point in the finite projective space, each of the respective point lying outside the hyperplane;

constructing a set of subspaces using a rational normal curve in a dual hyperplane of the hyperplane so that no more than a limited number of the subspaces intersect at a common point;

associating an encryption key with each second hyperplane in the finite projective space intersected by the hyperplane in an element of the set of subspaces;

allocating the associated respective encryption key to each authorized user when the associated respective second hyperplane passes through the respective assigned point; and forming each respective subset of the plurality of encryption keys using a second subset of the plurality of encryption keys distributed by the at least one betrayer so as to identify the at least one betrayer.

4. The method as recited in claim 3 wherein the set of subspaces includes $(d-1)k^2+1$ subspaces, the subspaces each having a dimension d-2, and wherein the limited number of subspaces is no more than d-1, d being a dimension of the finite projective space.

5. The method as recited in claim 3 wherein a respective intersection of each respective subset of the plurality of encryption keys and the second subset of the plurality of encryption keys includes at least $k(d-1)+1$ keys, d being a dimension of the finite projective space.

6. A method for identifying at least one betrayer of proprietary data, the method comprising:

encrypting the proprietary data using a session key;

dividing the session key into a plurality of subkeys using a threshold method so that the session key is reconstructable using one of the plurality of subkeys;

encrypting each of the plurality of subkeys using each encryption key of a plurality of encryption keys so as to form a plurality of cryptograms;

placing the plurality of cryptograms in front of the proprietary data as an access block; and assigning a respective subset of the plurality of encryption keys to each of a plurality of authorized users in accordance with at least one finite geometry structure and at least one finite geometry method so as to enable each user to reconstruct the plurality of subkeys and so as to ensure a k-resilience property for unequivocally identifying the at least one betrayer using a betrayer-search algorithm, k being a maximum number of betrayers in the at least one betrayer.

7. The method as recited in claim 6 wherein the finite geometry structure includes at least one of a finite affine space and a finite projective space.

8. The method as recited in claim 6 wherein the threshold method includes an r, t threshold method, t being a number of the plurality of subkeys.

9. A method for identifying at least one betrayer of proprietary data, the method comprising:

encrypting the proprietary data using a session key;

dividing the session key into a plurality of subkeys, all of the plurality of subkeys being required to reconstruct the session key;

encrypting each of the plurality of subkeys using each encryption key of a respective subset of the plurality of encryption keys so as to form a plurality of cryptograms, each respective subset being a function of the respective subkey;

placing the plurality of cryptograms in front of the proprietary data as an access block; and assigning a respective second subset of the plurality of encryption keys to each of a plurality of authorized users in accordance with at least one finite geometry structure and at least one finite geometry method so as to enable each user to reconstruct the plurality of subkeys and so as to ensure a k-resilience property for unequivocally identifying the at least one betrayer using a betrayer-search algorithm, k being a maximum number of betrayers in the at least one betrayer.

10. A method for identifying at least one betrayer of proprietary data, the method comprising:

encrypting the proprietary data using a session key;

dividing the session key into a plurality of subkeys using a threshold method so that the session key is reconstructable using one of the plurality of subkeys;

encrypting each of the plurality of subkeys using each encryption key of a respective subset of the plurality of encryption keys so as to form a plurality of cryptograms, each respective subset being a function of the respective subkey;

placing the plurality of cryptograms in front of the proprietary data as an access block, and assigning a respective second subset of the plurality of encryption keys to each of a plurality of authorized users in accordance with at least one finite geometry structure and at least one finite geometry method so as to enable each user to reconstruct the plurality of subkeys and so as to ensure a k-resilience property for unequivocally identifying the at least one betrayer using a betrayer-search algorithm, k being a maximum number of betrayers in the at least one betrayer.

* * * * *